United States Patent

[11] 3,628,015

| [72] | Inventor | Albert Franks<br>London, England |
|---|---|---|
| [21] | Appl. No. | 779,142 |
| [22] | Filed | Nov. 26, 1968 |
| [45] | Patented | Dec. 14, 1971 |
| [73] | Assignee | National Research Development Corporation<br>London, England |
| [32] | Priority | Nov. 29, 1967 |
| [33] | | Great Britain |
| [31] | | 54,346/67 |

[54] SCANNING MECHANISM FOR USE IN AN X-RAY SPECTROMETER
6 Claims, 4 Drawing Figs.

[52] U.S. Cl. .................................................. 250/51.5, 356/79

[51] Int. Cl. ........................................................ G01n 23/22
[50] Field of Search ............................................ 250/49.5 (8), 51.5; 356/79

[56] References Cited
UNITED STATES PATENTS
3,384,756  5/1968  Hasler et al. .................. 250/51.5

Primary Examiner—James W. Lawrence
Assistant Examiner—A. L. Birch
Attorney—Cushman, Darby & Cushman ABSTRACT: In a spectrometer incorporating a radiation detector which is movable so as to follow the focal curve of a dispersive element such as a curved grating or crystal, the movement of the detector is brought about by appropriately coordinating the operation of two mechanisms which respectively drive the detector radially and angularly relative to the dispersive element.

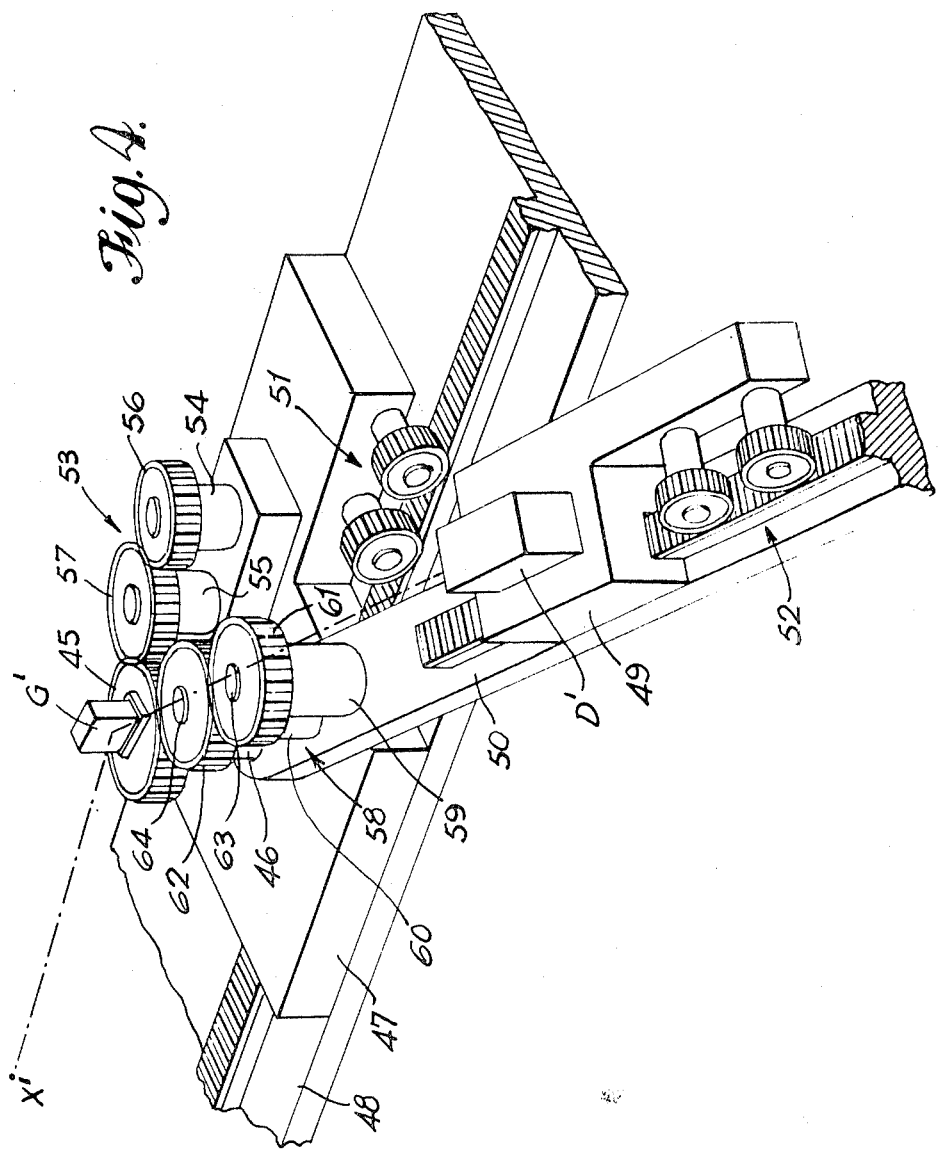

SCANNING MECHANISM FOR USE IN AN X-RAY SPECTROMETER

This invention relates to spectrometers and has particular but not exclusive application to X-ray spectrometers.

The invention is concerned with spectrometers of the kind adapted for use with dispersive elements having a focusing characteristic (e.g., curved gratings or crystals) and incorporating a scanning arrangement for moving a radiation detector relative to a dispersive element along a path corresponding to part of the focal curve of the dispersive element. This focal curve is normally of circular form and scanning arrangements conventionally employed involve either the mounting of the detector so as to be pivotable about the center of the relevant circle, or the provision of a fixed circular track along which the detector is moved. In the first case the mechanical layout involved may be inconveniently bulky, particularly for an X-ray spectrometer where the relevant parts are disposed within an evacuated enclosure, while in the second case the provision of an accurately machined track may present some difficulty.

According to the present invention the scanning arrangement in a spectrometer of the kind specified comprises a rectilinear track mounted for rotation about an axis perpendicular to the length of the track, a radiation detector mounted for movement along the track and disposed so that throughout such movement it will be responsive to radiation received from a given point on said axis, a first drive mechanism operable to drive the detector along the track, a second drive mechanism operable to rotate the track about said axis, and means for conjointly operating the two drive mechanisms so as to cause the detector to traverse a predetermined path relative to said axis.

In use of the spectrometer a dispersive element of appropriate form is disposed so that its pole occupies said given point on the axis of rotation of the track.

With an arrangement according to the invention, the mechanical layout may be made relatively simple and compact, without any requirement for the provision of an accurate curved track. Moreover, the means for operating the drive mechanisms may readily be designed so that the relationship between the movement of the detector along the track and the rotational movement of the track may be changed; this may be done with particular convenience if the two drive mechanisms incorporate electric servomotors. By taking advantage of this possibility, the same scanning arrangement can be used for dispersive elements having different focal curves (e.g., gratings of different radii) and allowance can be made for the departure of the focal curve of a dispersive element from its nominal form. Such facilities are of course not available with the conventional scanning arrangements referred to above, in which the path traversed by the detector is necessarily fixed.

The invention will be further described with reference to the accompanying drawings, in which:

FIG. 4 is a perspective view of a mechanism which may be utilized generally in X-ray spectrometers.

Figure 1:
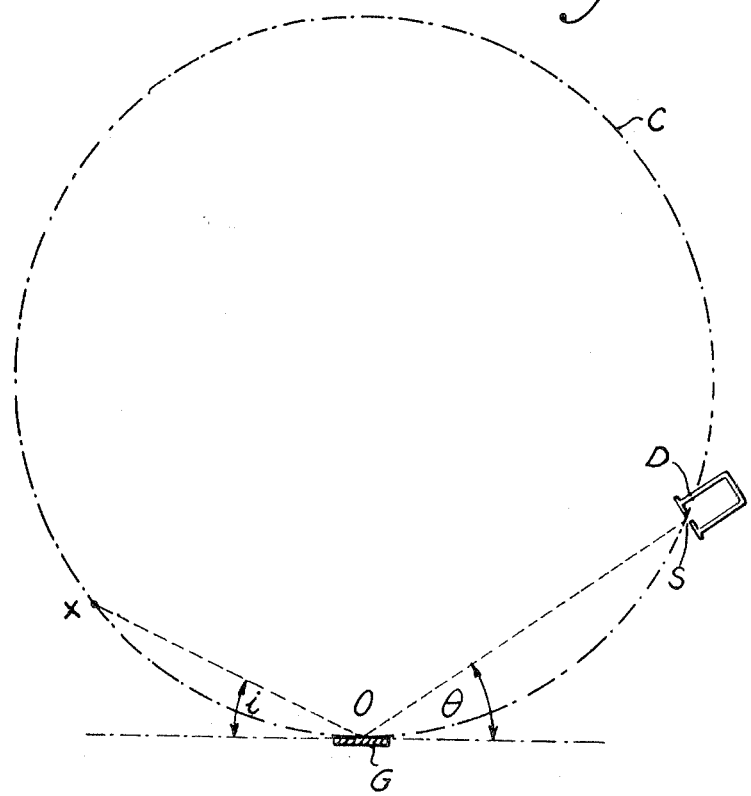
FIG. 1 is a diagram illustrating the layout of an X-ray spectrometer utilizing a conventional concave diffraction grating.

Referring to FIG. 1, the grating G, which has a radius of curvature R, has a focal curve in the form of a circle C (the Rowland circle) which has a diameter equal to R and touches the grating G at its pole O. The grating G is mounted in the spectrometer spaced from a source X of X-rays (which may for example be either a narrow slit from which X-rays diverge or part of a specimen undergoing analysis by investigation of the X-rays generated as a result of bombardment of the specimen by an electron beam), so that the source X lies on the circle C and so that rays from the source X strike the grating G at a glancing angle of incidence $i$; it will be appreciated that this requires the distance OX to be equal to $R \sin i$. A detector D (for example a Geiger counter) is provided to receive X-rays diffracted by the grating G at an angle $\theta$ (dependent on the wavelength of the rays), the detector D having a narrow entrance slit S. Scanning of the spectrometer requires the detector D to be moved relative to the grating G so that the slit S traverses a path corresponding to part of the circle C, that is such that for any given value of the angle $\theta$ the distance OS is equal to $R \sin \theta$. Normally the total change in the angle $\theta$ involved in scanning will be less than 15°.

Figure 2:
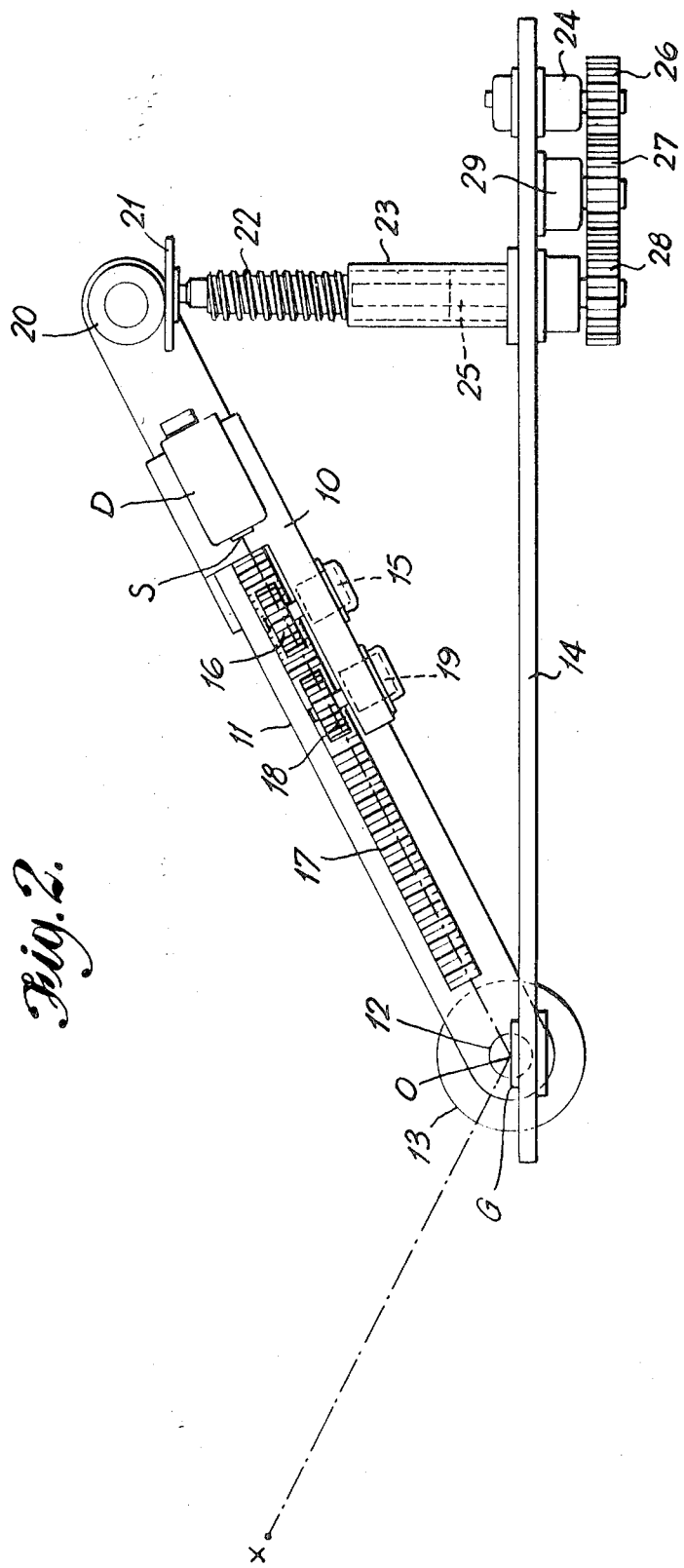
FIG. 2 is a side elevation of the mechanical part of a scanning arrangement for use in such a spectrometer.
Figure 3:
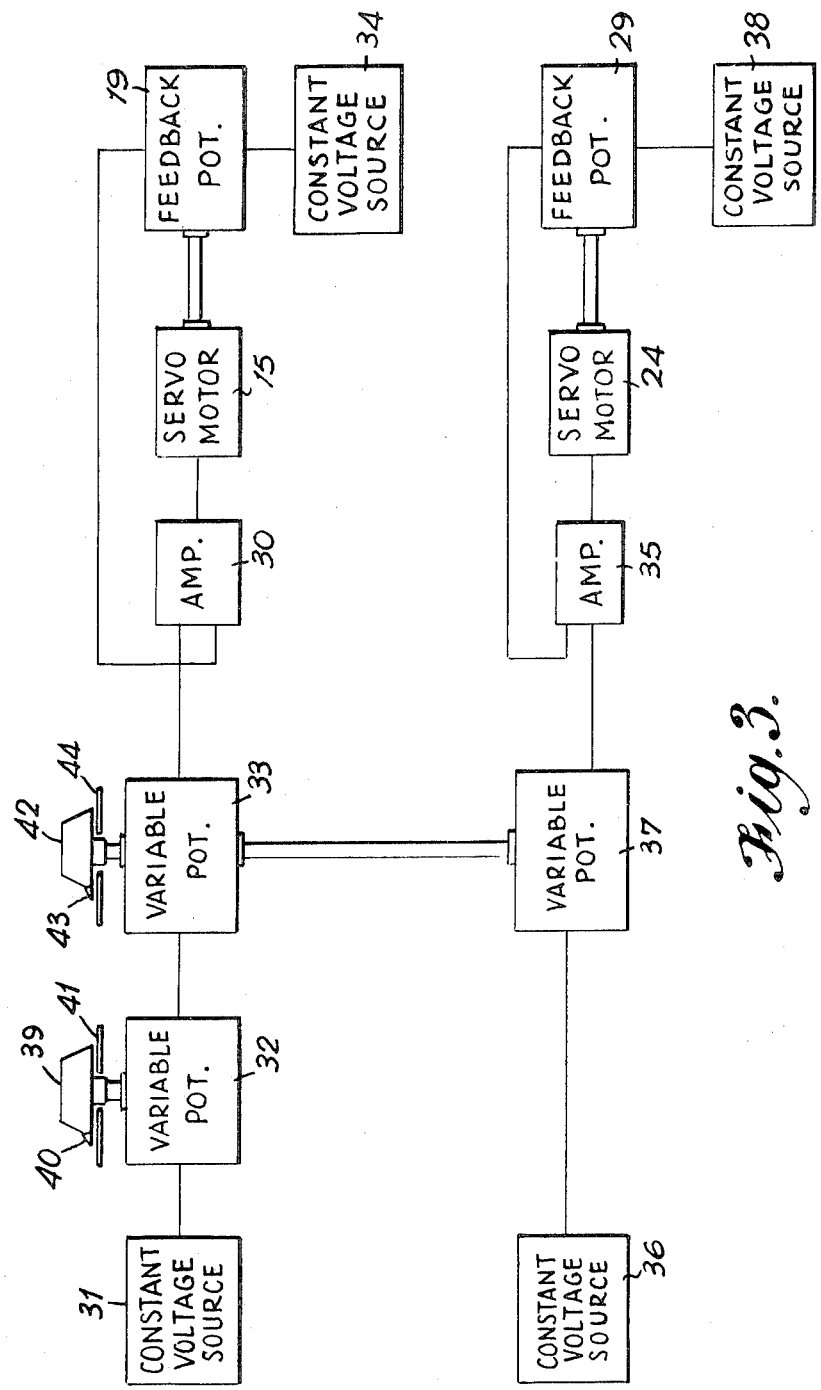
FIG. 3 is a diagram of a control system used with the mechanism shown in FIG. 2.

FIGS. 2 and 3 illustrate an arrangement in accordance with the invention which may be utilized for bringing about the required motion of the detector D discussed above. Referring to FIG. 2, the detector D is mounted on a carriage 10 which is movable along an arm 11, the arm 11 being secured adjacent one end to a shaft 12 whose axis is perpendicular to the longitudinal axis of the arm 11 and which is journaled for rotation in a bearing 13 mounted on a plate 14. The detector D is disposed so that as the carriage 10 is moved along the arm 11, the center of the entrance slit S of the detector D will traverse a straight line which intersects the axis of the shaft 12 at a given point; in use of the spectrometer a grating G is mounted on the plate 14 so that its pole O occupies this point, and the plate 14 is appropriately disposed relative to the X-ray source X with the line OX lying in the same plane perpendicular to the axis of the shaft 12 as the line transversed by the center of the slit S.

The carriage 10 is arranged to be driven along the arm 11 by means of an electric servomotor 15 mounted on the carriage 10 and coupled to a pinion wheel 16 which meshes with a rack 17 extending along the arm 11. Also meshing with the rack 17 is a further pinion wheel 18 rotation of which causes movement of the movable contact of a feedback potentiometer 19 incorporated in a control system (described further below) for the servomotor 15.

At its free end the arm 11 carries a roller 20 which is rotatable about an axis which extends parallel to the axis of the shaft 12 and which intersects the longitudinal axis of the arm 11. The arm 11 is biassed (either simply by gravity or by spring loading) so that the roller 20 bears on a plate 21 carried at one end of a screw 22 which engages with an internally threaded sleeve 23 mounted on and extending perpendicularly to the plate 14. Rotation of the screw 22, and hence rotation of the arm 11 about the axis of the shaft 12, is arranged to be brought about by means of a second electric servomotor 24 mounted on the plate 14, the servomotor 24 driving a shaft 25, which is keyed to the screw 22, via a train of gear wheels 26, 27 and 28. Rotation of the intermediate gear wheel 27 causes movement of the movable contact of a second feedback potentiometer 29 also mounted on the plate 14, the potentiometer being incorporated in a control system (described further below) for the servomotor 24.

Referring now also to FIG. 3, the servomotor 15 has applied to it a voltage derived from the output of a differential amplifier 30, to the inputs of which are respectively applied a voltage derived from a constant voltage source 31 via two manually variable potentiometers 32 and 33 connected in cascade and a voltage derived from a constant voltage source 34 via the feedback potentiometer 19. Similarly, the servomotor 24 has applied to it a voltage derived from the output of a differential amplifier 35, to the inputs of which are respectively applied a voltage derived from a constant voltage source 36 via a manually variable potentiometer 37 and a voltage derived from a constant voltage source 38 via the feedback potentiometer 29. The setting of the potentiometer 32 is controllable by means of a rotatable knob 39 carrying a pointer 40 which cooperates with a scale 41, while the settings of the potentiometers 33 and 37 are conjointly controllable by means of a rotatable knob 42 carrying a pointer 43 which cooperates with a scale 44, each of the potentiometers 32, 33 and 37 being constructed so as to give an output which varies linearly with rotation of the relevant knob 39 or 42. The feedback potentiometers 19 and 29 are constructed so as to give outputs which respectively vary linearly with rotation of the wheels 18 and 27.

A change in the setting of either of the potentiometers 32 and 33 will cause a voltage to be applied to the servomotor 15 so as to drive the carriage 10 along the track 11, the motion ceasing when the output from the amplifier 30 has been reduced to zero as a result of the consequent change in the setting of the potentiometer 19. A change in the setting of the potentiometer 37 will similarly cause rotation of the screw 22, and hence rotation of the arm 11 about the axis of the shaft 12. Thus, assuming for the moment that the setting of the potentiometer 32 remains fixed, a linear rotation of the know 42 will cause a linear change of the distance OS and a simultaneous linear change of the spacing of the axis of the roller 20 from the plate 14, this spacing being proportional to sin $\theta$. Rotation of the knob 42 will thus cause the center of the slit S to traverse a path of the required circular form; the radius of this path may be altered by rotation of the knob 39, thereby enabling the instrument to be used with gratings of different radii, since a change in the setting of the potentiometer 32 will alter the constant of proportionality between the changes of the distance OS and the spacing of the axis of the roller 20 from the plate 14.

It will be appreciated that the scales 41 and 44 may suitably be calibrated in terms of grating radius and X-ray wavelength respectively.

In a spectrometer of the kind illustrated in FIG. 1, it may also be required to make provision for adjustment of the angle of incidence $i$. Since this requires the distance OX to be varied, and it will normally be desirable to keep the source X fixed, the requirement can most conveniently be met by making provision for appropriate movement of the grating G, which must of course be accompanied by a movement of the detector D to preserve the necessary spatial relationship between the detector D and the grating G. Thus when using a scanning arrangement as described above with reference to FIGS. 2 and 3, the whole of the mechanism shown in FIG. 2 may be mounted on a further carriage (not shown) so that it is rotatable as a whole relative to the further carriage about the axis of the shaft 12, the further carriage being movable along a fixed rectilinear track (not shown) extending perpendicular to the axis of the shaft 12 in a direction such that movement of the further carriage causes the pole O of the grating G to traverse a straight line passing through the source X. In this case adjustment of the angle of incidence $i$ is effected by rotational movement of the mechanism shown in FIG. 2, accompanied by a simultaneous translational movement of this mechanism such as to maintain the distance OX equal to R sin $i$; the necessary related movements may conveniently be brought about be means of drive mechanisms similar to those described above for moving the detector D relative to the grating G.

The mechanism shown in FIG. 2 is particularly suitable for use in a spectrometer of the kind illustrated in FIG. 1. An alternative mechanism which may be utilized more generally in X-ray spectrometers of various types is shown in FIG. 4. In this case provision is made whereby four kinds of movement can be independently controlled, namely rotational and translational movements of a dispersive element G' relative to an X-ray source X', and rotational and translational movements of a detector D' relative to the dispersive element G'. The element G' is mounted on a support in the form of a toothed wheel 45 which is rotatable about a shaft 46 rigidly mounted on a carriage 47, the carriage being movable along a fixed rectilinear track 48. The detector D' is mounted on a carriage 49 which is movable along an arm 50, the arm 50 being supported from the carriage 47 so as also to be rotatable about the shaft 46. Drive mechanisms generally indicated 51 and 52 are provided respectively for driving the carriage 47 along the track 48 and for driving the carriage 49 along the arm 50, the drive mechanisms 51 and 52 being similar in form to that used for driving the carriage 10 along the track 11 in the arrangement of FIG. 2, and each incorporating an electric servomotor and a feedback potentiometer arranged similarly to the servomotor 15 and feedback potentiometer 19.

A drive mechanism generally indicated 53 is provided for rotating the wheel 45 about the shaft 46, the drive mechanism 53 incorporating an electric servomotor 54 and a feedback potentiometer 55 mounted on the carriage 47 and respectively associated with gear wheels 56 and 57, the wheel 57 meshing with the wheels 45 and 56. A drive mechanism generally indicated 58 is provided for rotating the arm 50 about the shaft 46, the drive mechanism 58 incorporating an electric servomotor 59 and a feedback potentiometer 60 mounted on the arm 50 and respectively associated with gear wheels 61 and 62; the wheels 61 and 62 are respectively rotatable about shafts 63 and 64 rigidly mounted on the arm 50, and the wheel 62 meshes with the wheels 45 and 61.

The drive mechanisms 51 and 52, 53 and 58 are arranged to be operated by feeding appropriately variable voltages to the servomotors incorporated in the drive mechanisms, by means of control systems (not shown) which may for example be of similar form to those illustrated in FIG. 3. It will be appreciated that the relationship between the drive mechanisms 53 and 58 is such that if the drive mechanism 53 is operated to bring about rotation of the wheel 45 while the drive mechanism 58 is not operated, the arm 50 will also be rotated through an equal angle, since the wheels 61 and 62 are effectively locked against rotation about the shafts 63 and 64; if, however, the drive mechanism 58 is operated to rotate the arm 50 while the drive mechanism 53 is not operated, the wheel 45 will not rotate simultaneously because of the effective locking of the wheels 56 and 57 against rotation.

The mechanism shown in FIG. 4 may for example be used in a spectrometer of the kind illustrated in FIG. 1, the drive mechanisms 51 and 53 being operated conjointly to adjust the angle of incidence $i$, and the drive mechanisms 52 and 58 being separately operated conjointly to effect scanning. The control systems for the drive mechanisms 52 and 58 in this case must, of course, be so related that a linearly varying rotation of the arm 50, brought about by operation of the drive mechanism 58, is accompanied by a sinusoidally varying movement of the carriage 49 along the arm 50, brought about by operation of the drive mechanism 52; thus if control systems similar to those illustrated in FIG. 3, are utilized the manually operable potentiometer corresponding to the potentiometer 33 must be constructed so as to give a sinusoidally varying output instead of a linearly varying one. Similar considerations apply to the control systems for the drive mechanisms 51 and 53.

Alternatively, the mechanism shown in FIG. 4 may be utilized in an X-ray spectrometer of the kind in which the dispersive element G' is in the form of a curved crystal. In this case the focal curve is again circular but the angle at which the X-rays are diffracted by the crystal is always equal to the angle of incidence of the X-rays on the crystal. Thus, in this case, scanning requires simultaneous movement of the detector D' relative to the element G' and movement of the element G' relative to the source X', the movements being so related that the entrance slit of the detector D' and the source X' throughout lie on the focal curve of the element G' at equal distances from the element G'. It will be appreciated that this requirement can be readily met when using the mechanism shown in FIG. 4 by conjointly operating all four drive mechanisms 51, 52, 53 and 58, the control systems for these drive mechanisms being appropriately related so as to preserve the necessary spatial relationship between the source X', the element G' and the detector D'.

The mechanism shown in FIG. 4 may also suitably be used where it is desired to utilize a dispersive element G' having a focal curve of other than circular form, for example a grating of variable spacing (for which it has been shown theoretically that large optical apertures are possible).

In all the scanning arrangements described above, the drive mechanisms for respectively bringing about translational and rotational movement incorporate electric servomotors. In alternative arrangements in accordance with the invention, however, the drive mechanisms could be of a purely mechanical nature, a suitable coupling between them being provided for ensuring the appropriate relationship between the operation of the two drive mechanisms. This coupling could be of a particularly simple nature if use were made of an arrangement similar to that shown in FIG. 2 involving the incorporation of a screw similar to the screw 22 in the drive mechanism bringing about the rotational movement. The use of purely mechanical drive mechanisms would, however, have the disadvantage of being less readily adaptable to cases where it is required to provide for a change of the relationship between the rotational and translational movements and in the case of an X-ray spectrometer would have the further disadvantage of requiring a mechanical linkage to be taken though the envelope of a vacuum system.

I claim:

1. In a spectrometer for use with radiation dispersive elements having a focusing characteristic, a scanning arrangement comprising:
   a. a rectilinear track mounted for rotation about an axis perpendicular to the length of the track;
   b. a radiation detector mounted for movement along the track and disposed so that throughout said movement it will be responsive to radiation received from a given point on said axis;
   c. a first drive mechanism operable to drive the detector along the track independently of any rotation of the track about said axis;
   d. a second drive mechanism operable to rotate the track about said axis; and
   e. means for conjointly operating the two drive mechanisms so as to cause the detector to traverse a predetermined path relative to said axis.

2. A spectrometer according to claim 1, in which the means for conjointly operating the two drive mechanisms comprises means operable to change the relationship between the movement of the detector along the track and the rotational movement of the track.

3. A spectrometer according to claim 1, in which each drive mechanism incorporates an electric servomotor.

4. In a spectrometer for use with radiation dispersive elements having a focusing characteristic, the combination of:
   a. a fixed rectilinear track;
   b. a carriage mounted for movement along said track;
   c. a support for a dispersive element mounted on the carriage for rotation about an axis perpendicular to the length of said track;
   d. a second rectilinear track mounted on the carriage for rotation about said axis and with the length of the second track perpendicular to said axis;
   e. a radiation detector mounted for movement along the second track and disposed so that throughout such movement it will be responsive to radiation received from a given point on said axis;
   f. a first drive mechanism operable to drive the detector along the second track;
   g. a second drive mechanism operable to rotate the second track about said axis;
   h. a third drive mechanism operable to drive the carriage along the fixed track; and
   i. a fourth drive mechanism operable to rotate said support about said axis.

5. A spectrometer according to claim 4, in which each drive mechanism incorporates an electric servomotor.

6. A spectrometer according to claim 4, in which the fourth drive mechanism is operable also to rotate the second track about said axis synchronously with said support.

* * * * *